Sept. 6, 1966 JAMES E. WEBB 3,271,594

ADMINISTRATOR OF THE NATIONAL AERONAUTICS AND SPACE ADMINISTRATION

TRANSIENT AUGMENTATION CIRCUIT FOR PULSE AMPLIFIERS

Filed June 16, 1964

RICHARD D. BENEDICT
INVENTOR.

BY [signatures]

ATTORNEYS

United States Patent Office 3,271,594

Patented Sept. 6, 1966

3,271,594
TRANSIENT AUGMENTATION CIRCUIT FOR PULSE AMPLIFIERS

James E. Webb, Administrator of the National Aeronautics and Space Administration with respect to an invention of Richard D. Benedict Filed June 16, 1964, Ser. No. 375,680
7 Claims. (Cl. 307—88.5)

This invention relates to digital data handling circuits and more particularly to a pulse circuit which augments the transient negative current capabilities of a pulse power amplifier.

Frequently the need arises in pulse transmission systems for amplifying a pulse signal with a minimum of distortion. Also, it is important in the design of digital logic to maximize high-speed capability. The problem of minimizing transient distortion in high-speed digital logic circuits has received the attention of many pulse circuit designers. While it is known that transient distortion and time degradation in pulse circuits can be avoided or compensated in various ways, the way of doing so contemplated in the present invention has been found to be particularly effective and economical. The useful applications of a circuit of this nature are many, and will be readily apparent to those skilled in the art.

The circuit of the present invention is especially useful in pulse amplification for digital logic circuits since it can supply the current required to discharge line capacitances in a minimum of time, and at the same time prevent distortion of the voltage pulse. A negative current, as used hereinafter, is defined as flowing from the load to the pulse generator. The application of the circuit of the invention is primarily directed to those cases in which the load may be reduced to an equivalent series RLC circuit which is over damped. Negative current drive is required for such a load for two possible reasons. One reason is to discharge the load capacitance in a relatively short period of time. The second reason is to "pull down" or "hold down" the load input voltage to its negative level during the time the load capacitance is discharging. These functions are provided by the novel circuit of the present invention. A feature of the circuit of the invention is that it is short circuit safe; i.e., the output may be short circuited to ground potential for an indefinite period of time without damaging the circuit.

Stated differently, the apparatus of the present invention comprises a feedback amplifier capable of supplying negative current to over damped series RLC circuits. A typical embodiment comprises a two-stage transistor inverter, which supplies base drive to the second stage amplifier through an over damped series RLC coupling network. The collector for the second stage amplifier is connected to the input of the first stage amplifier, providing regeneration. The emitter of the second amplifier stage is clamped to the reference logic level such that the input voltage is maintained during the pulse.

The "short-circuit safe" feature of the invention arises from its design which permits the input-output terminal to be shorted to ground potential. This condition places the circuit in the "off" state, during which both transistors are cut off. As the transistors are essentially open circuits when cut off, the circuit does not dissipate power except when supplying a load. This capability improves the efficiency of the circuit and also precludes the possibility of damage if the output is inadvertently shorted. The circuit of the invention is also useful for restoring degraded pulse data at the same time it speeds digital switching time by supplying the required load currents. The circuit is applicable to a variety of pulse handling systems such as industrial process controllers, computers, and telemetry systems as well as in space craft instrumentation.

An important feature of the device of the invention is its simplicity and its relative flexibility in supplying various load currents at a constant voltage, merely by selecting the proper shaping networks and transistors. Conventional pulse amplifiers do not normally simultaneously supply a power pulse and maintain line voltage as is provided in the present invention. Conventional circuits, used heretofore, have normally required additional clamp circuits to provide clamping action.

It is therefore a principal object of the invention to provide novel and improved pulse circuit means which will provide or augment the transient negative current capacities of a pulse amplifier.

Another object of the invention is to provide novel and improved circuit means for use in improving the high-speed capabilities of pulse power amplifiers.

Yet another object of the invention is to provide novel and improved circuit means for minimizing pulse distortion in digital logic circuits.

Still another object of the invention is to provide novel and improved pulse circuit means for supplying the required load current in high-speed digital switching circuits.

A general object of the invention is to provide a novel and improved pull-down circuit which overcomes disadvantages of previous means and methods heretofore intended to accomplish generally similar purposes.

Many other advantages, features and additional objects of the present invention will become manifest to those versed in the art upon making reference to the detailed description and the accompanying sheet of drawings in which a preferred structural embodiment, incorporating the principles of the present invention is shown by way of illustrative example.

Broadly, the concept relates to a circuit having two inverter stages and a positive feedback path between the two inverters, the circuit being arranged to pull down, or hold down, the input voltage to its negative level during the discharge interval of the load capacitance.

Figure 1:
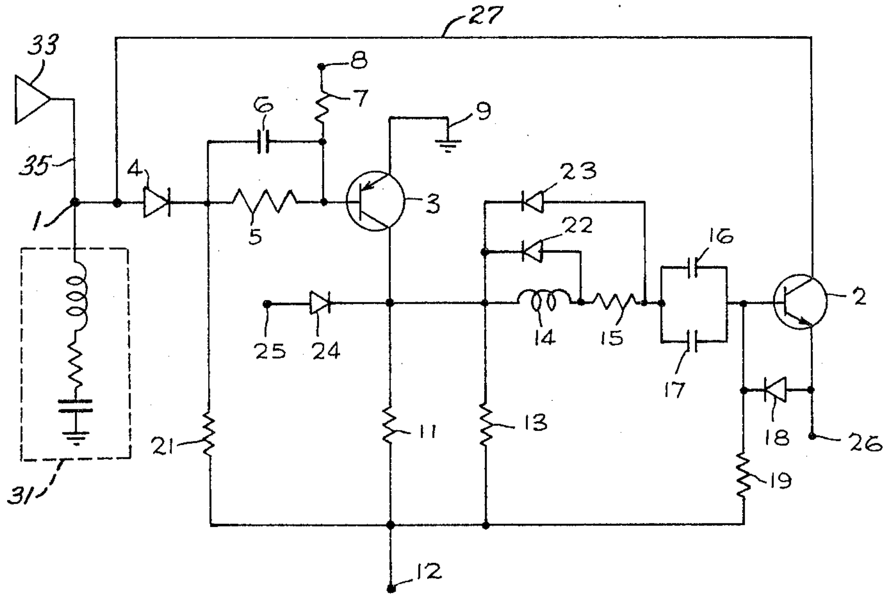
FIGURE 1 is a schematic circuit diagram of a preferred embodiment of the invention.

Looking now at FIGURE 1 there is shown a schematic diagram of a preferred embodiment of the invention. Terminal 1 comprises a common input-output connection to the circuit and is connected to the pulse amplifier 33 by line 35. The circuit is designed to operate with loads which are the equivalent of an overdamped series RLC circuit, as shown generally at 31. The active circuit elements comprise transistors 2 and 3 which are arranged in a cascaded two-stage inverter amplifier circuit with positive feedback around both stages. The signal applied to terminal 1 is supplied to the base of PNP transistor 3 via diode 4 and series resistor 5. Resistor 5 is shunted by capacitor 6. A positive operating potential is supplied to the input stage (3) via resistor 7 and power supply terminal 8. This positive supply is nominally +26 volts in a typical construction of the circuit. The emitter of transistor 3 is returned to ground 9. The collector of transistor 3 is referenced to a negative supply voltage (nominally −26 volts) via resistor 11 and terminal 12. The collector is clamped at a negative level by means of diode 24. Nominally, the clamp level is set at −6.5 volts which is supplied via terminal 25.

Base drive to the second stage inverter amplifier (2) is supplied through a critically damped series RLC coupling network. This coupling network comprises inductance 14, series resistor 15, and capacitors 16 and 17. Inductance 14 is shunted by diode 22. The series combination of inductance 14 and resistor 15 is shunted by diode 23. The output of the RLC network (14–17, 22 and 23) drives the base of NPN transistor 2. The emitter of transistor 2 is directly connected to the negative clamp voltage supply (nominally —6.5) via terminal 26, and is clamped to the reference logic level such that the input voltage is maintained during the pulse. The base of transistor 2 obtains its cutoff bias potential via resistor 19. The collector of transistor 2 is returned directly to the input-output terminal 1. If the voltage level at input-output terminal 1 goes to ground potential (9) when transistor 2 is ON, transistor 3 is cut off and transistor 2 is cut off by reverse base drive through capacitors 16 and 17, diode 23, and resistors 11 and 13. Thus, the pull-down circuit is short circuit safe. Transistor 2, which provides a low impedance path for the negative transient load current, is cut off under D.C. voltage conditions at the input-output terminal 1.

When the voltage at the input-output terminal 1 falls from ground (9) to —6.5, transistor 3 is saturated. Transistor 3 generates base current to saturate transistor 2. Transistor 2 also acts as a voltage inverter. The positive feedback path from the collector of transistor 2 to the input-output terminal 1, together with the characteristically high loop gain of the two amplifier stages makes the condition regenerative. That is to say, that once the voltage level at the input-output terminal 1 drops, the pull-down circuit forces the voltage to stay at the lower level for a period of time, provided that the load currrent supplied to the collector of transistor 2 is not large enough to force transistor 2 out of saturation.

Figure 2:
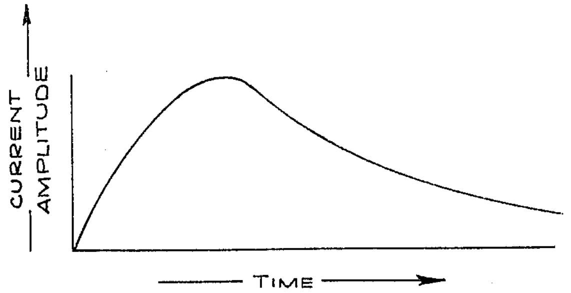
FIGURE 2 is a waveform diagram of assistance in the exposition of the invention.

The RLC base network driving transistor 2 generates a base current versus time waveform which has the same shape as the negative short circuit current of an overdamped RLC circuit load. There is shown in FIGURE 2 a typical negative short circuit current waveform, in which amplitude is plotted as a function of time, of an overdamped RLC load. As can be seen, the current amplitude rises somewhat sharply to a peak value and thereafter gradually decreases. The RLC base network of transistor 2 generates a base current versus time waveform in response to a step change at the input-output terminal, which is essentially the same shape as the negative short circuit current waveform shown in FIGURE 2. The product of the base current of transistor 2 and the current gain of this transistor produces a permissible collector current waveform on line 27 which is sufficiently large to envelop the negative short circuit current waveform of an overdamped RLC circuit load connected to terminal 1. Both transistors (2 and 3) are essentially open circuits when cut off and do not dissipate power except when supplying a load. This feature improves the circuit efficiency and precludes damage if the input is inadvertently shorted.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the invention be limited only as indicated by the scope of the following claims:

What is claimed is:

1. A transient augmentation circuit for a pulse amplifier having an equivalent overdamped series resistance-inductance-capacitance load comprising:

a first inverter amplifier having an input and output;

a second inverter amplifier having an input and output;

a resistance-inductance-capacitance network connected between the output of said first inverter amplifier and input of said second amplifier, the current amplitude versus time characteristic of said network, in response to a step change input, being proportional to the negative short circuit current versus time characteristic of an overdamped series resistance-inductance-capacitance load; and input-output terminal means joining the input of said first inverter amplifier and output of said second inverter amplifier to provide regeneration in said transient augmentation circuit.

2. An apparatus as defined in claim 1 in which said second inverter amplifier includes: voltage clamp means for maintaining a given negative input voltage level at said input-output terminal means during a current change at said input-output terminal.

3. An apparatus as defined in claim 1 wherein said network comprises:

an inductance, a resistance, and a capacitance, connected in series; and a first diode shunt-connected across said inductance; and a second diode shunt-connected across the series combination of said inductance and said resistance.

4. An apparatus as defined in claim 1 wherein said first inverter amplifier comprises:

a PNP transistor amplifier; and said second inverter amplifier comprises an NPN transistor amplifier.

5. A transient augmentation circuit comprising:

an input-output terminal for connecting said pulse circuit to an external transient augmentation carrying line and to a load having an equivalent overdamped series resistance-inductance-capacitance circuit;

a first transistor having a base, a grounded emitter, and a collector;

a source of negative operating potential connected to the collector of said first transistor;

a first network connecting the base of said first transistor to said input-output terminal;

a source of positive operating potential connected to the junction between said first network and base of said first transistor;

a second transistor having a base, an emitter, and a collector, and having complementary symmetry with respect to said first transistor;

an overdamped series resistance-inductance-capacitance network connected between the collector of said first transistor and the base of said second transistor;

a source of negative bias potential connected to the emitter of said second transistor; and means connecting the collector of said second transistor to said input-output terminal to provide regeneration in said transient augmentation circuit and to maintain said input-output terminal means at a predetermined negative voltage level during a current change at said input-output terminal.

6. An apparatus as defined in claim 5 including:

clamp means connected between the collector of said first transistor and said source of negative bias potential.

7. An apparatus as defined in claim 5 including:

clamp means connected between the base of said second transistor and said source of negative bias potential.

References Cited by the Examiner

UNITED STATES PATENTS

| | | | |
|---|---|---|---|
| 2,973,439 | 2/1961 | Wright | 307—88.5 |
| 3,076,103 | 1/1963 | Bianchi | 307—88.5 |
| 3,084,265 | 4/1963 | Cleland | 307—88.5 |
| 3,105,158 | 9/1963 | Nichols | 307—88.5 |
| 3,163,780 | 12/1964 | Fischman et al. | 307—88.5 |
| 3,172,051 | 3/1965 | Baron et al. | |

References Cited by the Applicant

UNITED STATES PATENTS 2,961,552 G. J. C. Andresen.

3,083,303 W. S. Knowles et al.

ARTHUR GAUSS, *Primary Examiner.*

I. C. EDELL, *Assistant Examiner.*